(12) United States Patent
Siquenique

(10) Patent No.: US 10,433,157 B2
(45) Date of Patent: Oct. 1, 2019

(54) METHOD FOR ENABLING A COMMUNICATION BETWEEN A MOBILE DEVICE AND A COMMUNICATION RECEIVER

(71) Applicant: Vodafone GmbH, Düsseldorf (DE)

(72) Inventor: Joao Siquenique, Meerbusch (DE)

(73) Assignee: Vodafone GmbH, Dusseldorf (DE)

( * ) Notice: Subject to any disclaimer, the term of this patent is extended or adjusted under 35 U.S.C. 154(b) by 792 days.

(21) Appl. No.: 14/919,806

(22) Filed: Oct. 22, 2015

(65) Prior Publication Data
US 2016/0119779 A1  Apr. 28, 2016

(30) Foreign Application Priority Data

Oct. 23, 2014  (EP) .................................... 14190097

(51) Int. Cl.
| | |
|---|---|
| *H04W 8/24* | (2009.01) |
| *H04W 76/10* | (2018.01) |
| *H04W 4/80* | (2018.01) |
| *H04L 12/58* | (2006.01) |
| *G06Q 20/32* | (2012.01) |
| *H04W 4/18* | (2009.01) |
| *H04W 4/14* | (2009.01) |
| *H04L 29/06* | (2006.01) |
| *H04W 84/12* | (2009.01) |

(52) U.S. Cl.
CPC ............ *H04W 8/24* (2013.01); *G06Q 20/327* (2013.01); *G06Q 20/3274* (2013.01); *G06Q 20/3278* (2013.01); *H04L 51/066* (2013.01); *H04L 69/24* (2013.01); *H04W 4/14* (2013.01); *H04W 4/18* (2013.01); *H04W 4/80* (2018.02); *H04W 76/10* (2018.02); *H04W 84/12* (2013.01)

(58) Field of Classification Search
CPC ........ H04W 4/80; H04W 4/18; H04L 51/066; G06Q 20/3227; G06Q 20/327; G06Q 20/3274; G06Q 20/3278
USPC ......................... 235/375, 487, 492, 382, 384
See application file for complete search history.

(56) References Cited

U.S. PATENT DOCUMENTS

| | | | |
|---|---|---|---|
| 8,459,560 B1 | 6/2013 | Mineo-Goggin | |
| 2012/0239578 A1* | 9/2012 | Kang | G06Q 20/20 705/71 |
| 2012/0310760 A1* | 12/2012 | Phillips | G06Q 40/02 705/26.1 |
| 2013/0079037 A1* | 3/2013 | Dobyns | H04W 4/023 455/456.3 |
| 2013/0110658 A1* | 5/2013 | Lyman | G06Q 20/20 705/18 |
| 2013/0317927 A1* | 11/2013 | Bush | G06Q 20/3278 705/21 |
| 2014/0279530 A1* | 9/2014 | Douglas | G06Q 20/322 705/44 |

(Continued)

*Primary Examiner* — Paultep Savusdiphol
(74) *Attorney, Agent, or Firm* — Hodgson Russ LLP

(57) ABSTRACT

A method for enabling a communication between a mobile device (10) and a communication receiver (30) includes the steps of recognizing at least one receiving information type (32) of the communication receiver (30), and transforming a storing information type (22) of an information element (20) into a sending information type (12) of the mobile device (10) which is compatible with the recognized receiving information type (32) of the communication receiver (30).

14 Claims, 6 Drawing Sheets

(56) References Cited

U.S. PATENT DOCUMENTS

Figure 1:
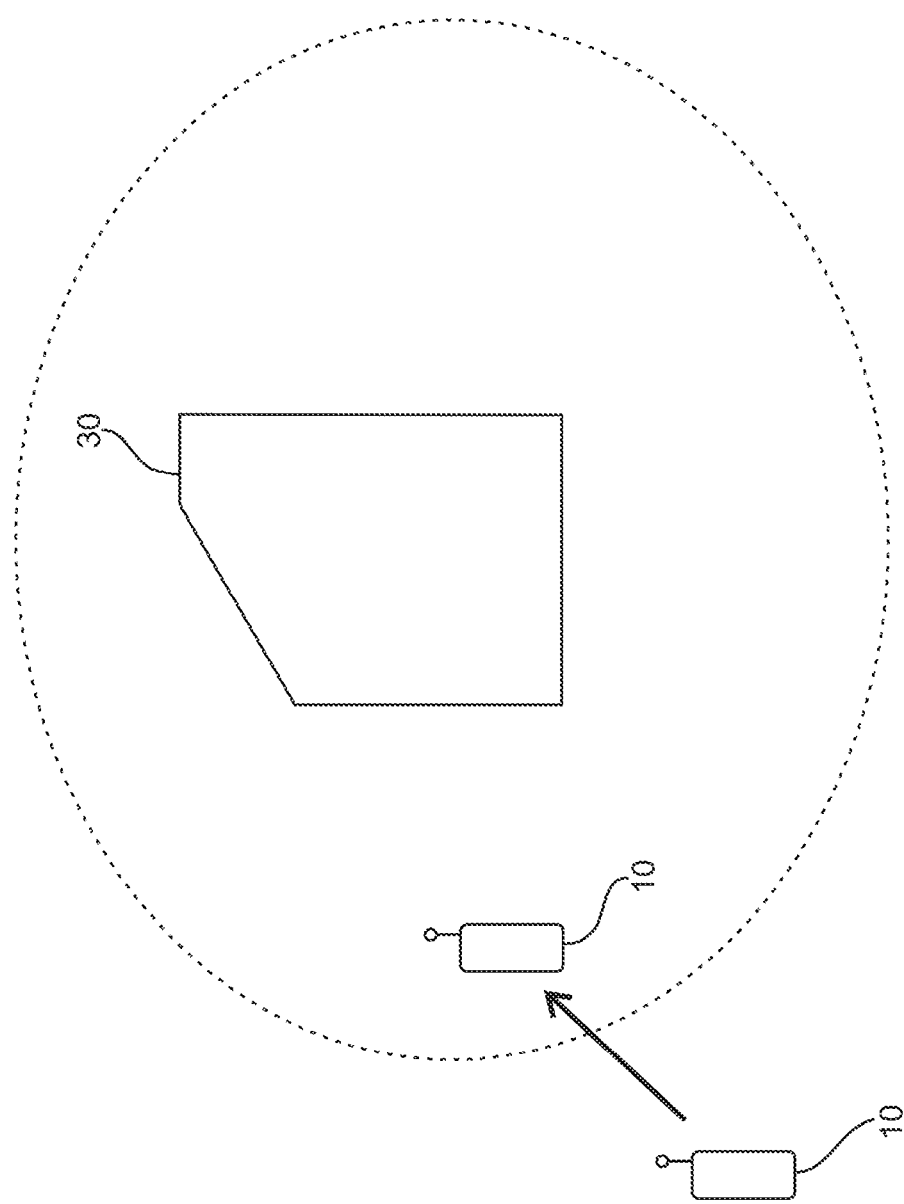

| | | | | |
|---|---|---|---|---|
| 2014/0297439 A1* | 10/2014 | Hasson | ................ | G06Q 20/10 705/21 |
| 2015/0100443 A1* | 4/2015 | Van Heerden | ....... | G06Q 20/227 705/16 |
| 2016/0132873 A1* | 5/2016 | Elbaum | ................ | G06Q 20/10 705/71 |

* cited by examiner

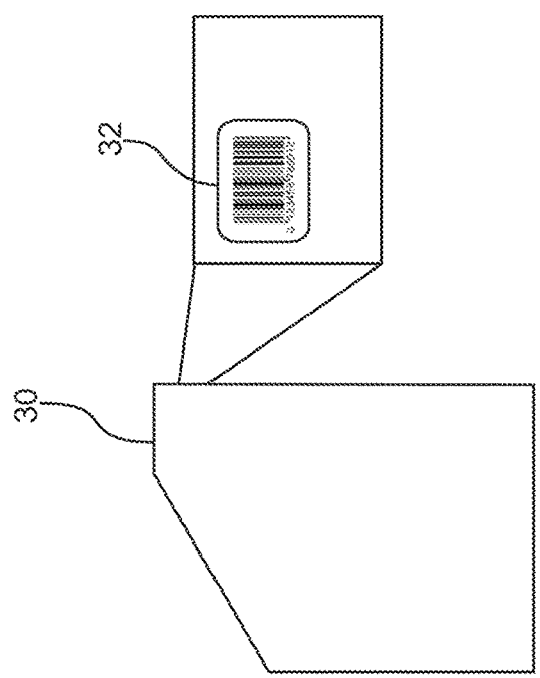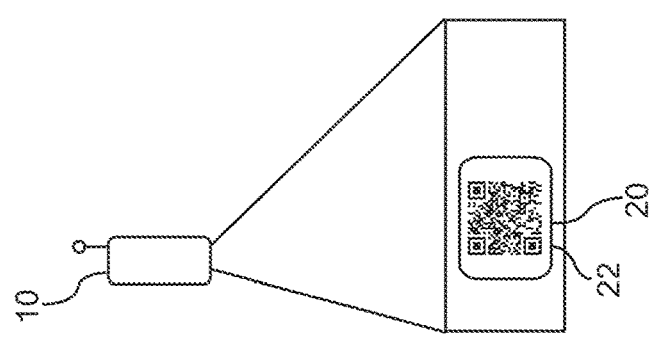
Fig. 2

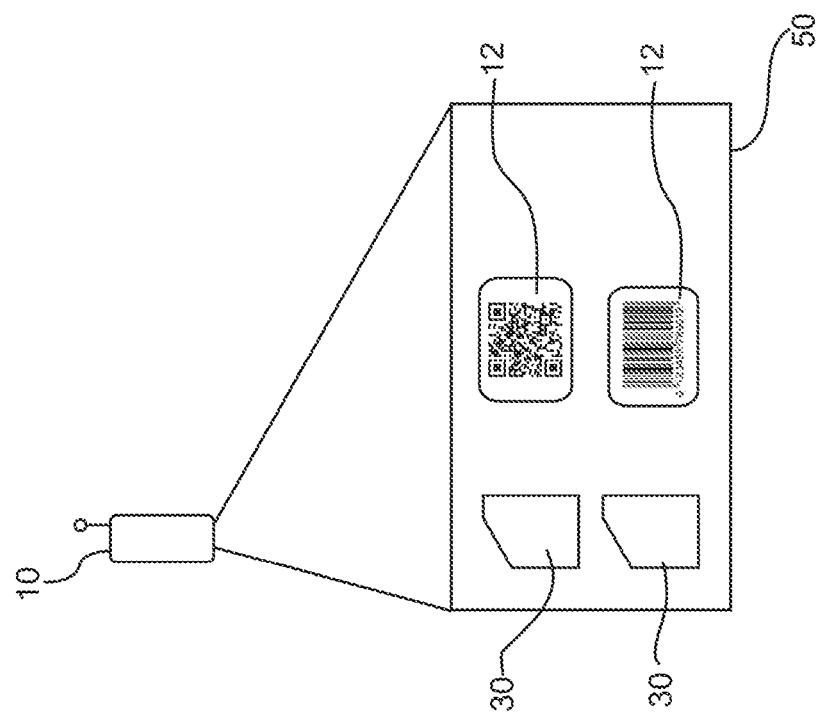

METHOD FOR ENABLING A COMMUNICATION BETWEEN A MOBILE DEVICE AND A COMMUNICATION RECEIVER

CROSS REFERENCE TO RELATED APPLICATIONS

This application claims priority of European Patent Application No. 14 190 097.7 filed Oct. 23, 2014, the entire disclosure of which is incorporated by reference herein.

FIELD OF THE INVENTION

The present invention is related to a method for enabling a communication between a mobile device and a communication receiver as well as a computer program product being stored on a computer readable medium enabling a communication between a mobile device and a communication receiver.

BACKGROUND OF THE INVENTION

It is generally known that mobile devices are used to communicate with communication receivers. One example is the boarding situation of a plane. An information element in form of a boarding pass can be stored on the mobile device. To enter the plane, a communication has to take place between the mobile device and a communication receiver near the entrance of the plane. Usually, the mobile device presents the information element in form of a specific information type, for example, in form of a barcode or a QR code. The communication receiver receives this information element in the storing information type. This leads to a fast and efficient way of a communication between a mobile device and a communication receiver. Also further situations, for example, an access control into a building or a ticketing service in front of a cinema, can be structured in the same way.

The already known method depend strongly on the fact that the communication receiver and the mobile device are able to communicate with the same way of information type and with the same way of communication type. Therefore, the mobile device necessarily needs to have the information element in form of a storing information type, which is compatible to the receiving information type of the communication receiver. If, for example, the communication receiver is only able to read a QR code and the mobile device comprises the information element only as a barcode, a communication is not possible. According to the state of the art, therefore, no communication takes place and the advantage of electronic communication channels cannot be achieved in this specific situation.

SUMMARY OF THE INVENTION

Based on aforesaid disadvantages it is a goal of the present invention to overcome that disadvantages at least partly. In particular, it is a goal of the present invention to provide a communication between a mobile device and a communication receiver in as much situations as possible.

Aforesaid goal is achieved by a method as well as a computer program product as described herein.

Further features and details of the invention are also described and shown in the figures. Features and details discussed with respect to the inventive method therefore are also correlated with the inventive computer program product and the other way around.

According to the present invention, a method is provided for enabling a communication between a mobile device and a communication receiver. Such a method comprises the following steps:

Recognizing at least one receiving information type of the communication receiver, Transforming a storing information type of an information element into a sending information type of the mobile device, which is compatible with the recognized receiving information type of the communication receiver.

According to the present invention, a communication between a mobile device and a communication receiver is enabled via a pre-step before the specific communication takes place. In this first step, a recognition takes places in the mobile device, in the communication receiver and/or in a separate module, for example, an adapter for the mobile device or the communication receiver. In that first step, it is recognized what kind of communication receiver in respect to the receiving information type is to be enabled for a communication with the mobile device. For example, a communication receiver such as an entrance system of a door is able to receive information in two different types. For example, these types can be a QR code or a barcode. In this case, for example, a mobile device arrives at the communication receiver having an information element to pass this securing system of the door, which is provided in a storing information type of a barcode. In such a case, no transformation is necessary. However, if the information element is stored in a separate storing information type, for example, an electronic RFID type, transformation has to take place. This transformation is carried out in particular in the communication receiver, the mobile device and/or a separate adapter of these two modules. The transforming step is aimed on a compatibility between the sending information type of the mobile device and the receiving information type of the communication receiver.

Based on the inventive method in a situation where the storing information type of the information element and the receiving information type do not fit together, for example, the receiving information type is a QR code and a storing information type is a barcode, in the state of the art situation, no communication would have taken place. According to the present invention it is now possible to transform the storing information type into a compatibility situation such that the barcode is transformed to the sending information type of a QR code and such the communication between the mobile device and the communication receiver is enabled.

According to the present invention, an information type of the information element or the communication receiver of the mobile device is to be understood as the way the information element is stored and/or is communicated. For example, such an information type can be a barcode, a QR code, an NFC storing element, and RFID storing element, an SMS storing element, and so on. A transformation gives know the possibility to enable communication in much more situations than a state of the art process does.

The communication receiver can provide the receiving information type as to one or more receiving information types actively or can be interrogated by later on described recognizing requests. The transformation step can take place in general by a trial-and-error method or specifically aimed on a priority list on better or worse sending information as to the security or the speed of the transfer of the information element.

It is of advantage that according to the present invention a method characterized in that for recognition of the at least one receiving information type a recognition request is sent to the communication receiver, in particular from the mobile device, triggering the communication receiver to send a recognition answer to the mobile device. This is one possibility of actively starting the inventive method. For example, a user can start the recognition step manually on his mobile device. A recognition request can be formed in form of an empty list, which is filled in by the communication receiver with possible receiving information types. Of course, it is also possible that the recognition request functions like trial-and-error and tries different kind of information types within the communication receiver and fills in the empty spaces in the list itself. Therefore, the mobile device or a separate module of the mobile device gets information about the receiving information type and can recognize at least one receiving information type. In that case, the response, which is triggered at the communication receiver, can also be sent automatically by trial-and-error or specifically with a filled out list of possible receiving information types.

It is further of advantage that according to the present invention the method is characterized in that the recognition step is carried out automatically in case of approximation of the mobile device to the communication receiver. For example, the communication receiver and/or the mobile device can comprise proximity sensors. If now the mobile device and/or the communication receiver senses the proximity of a mobile device, respectively a communication receiver, the inventive method is started automatically. It is also possible that the recognition step is proposed automatically and enabled manually by the user of the mobile device and/or the communication receiver. The proximity sensors can, for example, comprise NFC sensors or RFID sensors. As a communication channel, for example, a wireless LAN, Bluetooth or the like is also possible to be used. The use of an automatic start of the inventive method by approximation of the mobile device to the communication receiver the whole process of communication exchange and information exchange is speed up. For example, a user approaching a door with a door access system is automatically enabled for a communication due to the fact that during the approach to the door access system the method of correlating and enabling the inventive method is already carried out automatically. When the user arrives the door access system the transformation step has already being carried out and he can directly pass the access system.

It is further of advantage that according to the present invention the method is characterized in that after the recognition step a step of comparing the recognized receiving information types with sending information types of the mobile device is carried out. This step can take place in the communication receiver, the mobile device and/or a separate module of both elements. This leads to a situation where in a specific and guided way the sending information type for the transformation step is specifically chosen. For example, a later on described priority list can be used for such a choosing step. The comparing of recognized receiving information types with sending information types shows the possibility of one, two or even more possible communication channels and possible compatible information types between the mobile device and the communication receiver.

Furthermore, it is of advantage that according to the present invention the method is characterized in that in a case of two or more sending information types being compatible with the recognized receiving information types the storing information type of the information element is transformed into one specific compatible sending information type according to a priority list. Such a priority list can, for example, store the priority as to the specific parameters. For example, it is possible, that according to the priority list always the fastest information type according to the communication time or the communication speed is chosen. It is also possible that according to the priority list always the most secure information type is chosen for the sending information type for the transformation step. Of course, such a priority list can also depend from the sort respectively the type of the communication receiver and/or the type of the information element such that speed and/or security can be chosen in different manners in different situations.

It is further of advantage that according to the present invention the method is characterized in that after the transformation step the information element is sent in the sending information type to the communication receiver. As it become apparent from the aforesaid description, the inventive method is mainly focused on the general enablement of a communication between the mobile device and the communication receiver. The actual transmission of the information element does not have to be part of the present invention. For example, the present invention has already been carried out when the mobile device is enabled and ready to start the transmission of the information element. If the transmission of the information element takes place can be dependent on further inputs, for example, on manual activation of the user of the mobile device. Of course, it is also of advantage that after the transformation step the sending step of the information element can be also carried out automatically. Thereby, the respective chosen information type can comprise also the communication channel to be used, for example, Bluetooth, wireless LAN, infrared or any other possible communication channel as to technical solutions. Also, here a priority selection as to the communication channel is possible which has been described with respect to the priority list in the above.

It is further of advantage that according to the present invention the method is characterized in that the information element is sent via at least one of the following communication channels:

Bluetooth
Wireless LAN
NFC (near field communication)
SMS (short message service)
Infrared transmission Aforesaid list is a non-final. Also, communication channels can be used or recognized in the recognition step. Of course, also a combination of two or more communication channels is possible as to the recognition step and the transmission step of the information element.

A further advantage can be achieved by an inventive method which is characterized in that the transformation and/or the recognition step is carried out based on an activation and/or a selection of a user of the mobile device. This leads to the situation that the user is manually in charge for starting the inventive method. This way the security for the user of the mobile device is increased significantly. In particular, the user can decide on starting the method, recognizing different kind of receiving information types and in particular selecting a specific sending information types for the transforming step. Also, the transmission step of the information element itself can be decided and activated or set free by the user himself A further advantage is possible according to the present invention if the method is characterized in that the recognized at least one receiving information type and/or the sending information type of the transformation step is stored, in particular at the mobile device, for following communications with the same communication receiver or other communication receivers of the same type. This leads to a situation where for the second communication between the same mobile device and the same communication receiver the storing information can be provided by a history list, for example, within the mobile device, such that the transformation step can take place directly and the recognition step is focused on a reading of the history list in recognition of the type or the specification of the communication receiver. This leads to an easier and much more safer situation for the present invention. In particular, the comparison of a history list can be also carried out during an approach and according to the proximity between the mobile device and the communication receiver.

It is further of advantage that according to the present invention the method is characterized in that the stored at least one receiving information type and/or the stored sending information type of the transformation step is sent to other mobile devices, in particular via a mobile network. For example, the history list can be updated with a server and sent to the server for an update process. This leads to a situation where even for the first appearance of a mobile device in front of a communication receiver information can be downloaded from a server to other mobile devices, which is provided from a history list. This leads to a much easier recognition step even for the first time of enabling a communication between a mobile device and a communication receiver.

A further aspect of the present invention is a computer program product being stored on a computer readable medium enabling a communication between a mobile device and a communication receiver. Such a computer program product comprises the following:

Computer readable program means (e.g. programming instructions stored on the computer readable medium), initiating the computer to recognize at least one receiving information type of the communication receiver, and Computer readable program means, initiating the computer to transform a storing information type of an information element into a sending information type of the mobile device, which is compatible with the recognized receiving information type of the communication receiver.

An inventive computer program is in particular characterized in computer readable program means, initiating the computer to carry out an inventive method. Thereby, an inventive computer program product provides the same advantages, which have been discussed in detail with respect to the inventive method.

BRIEF DESCRIPTION OF THE DRAWING VIEWS

Figure 3:
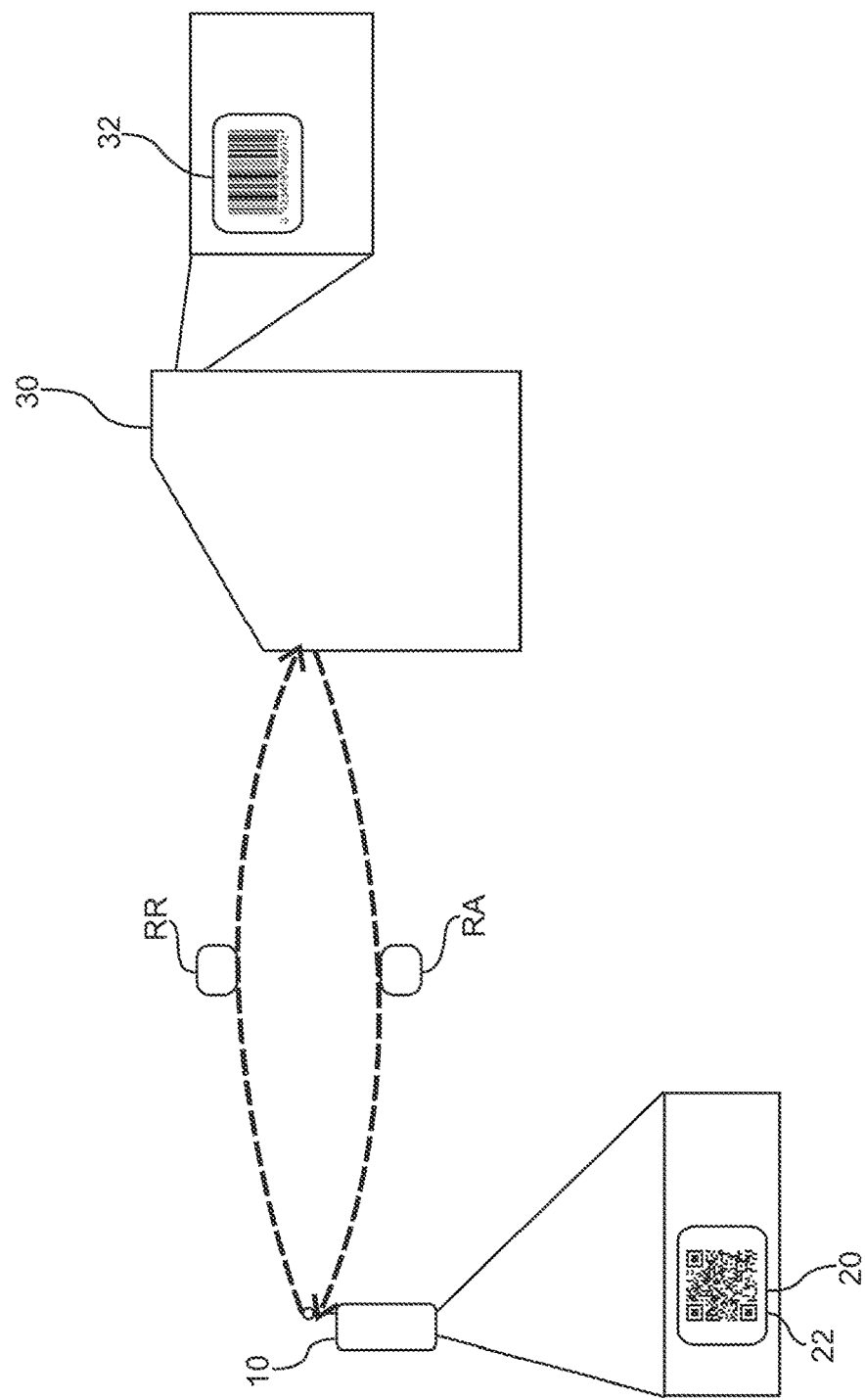
Figure 4:
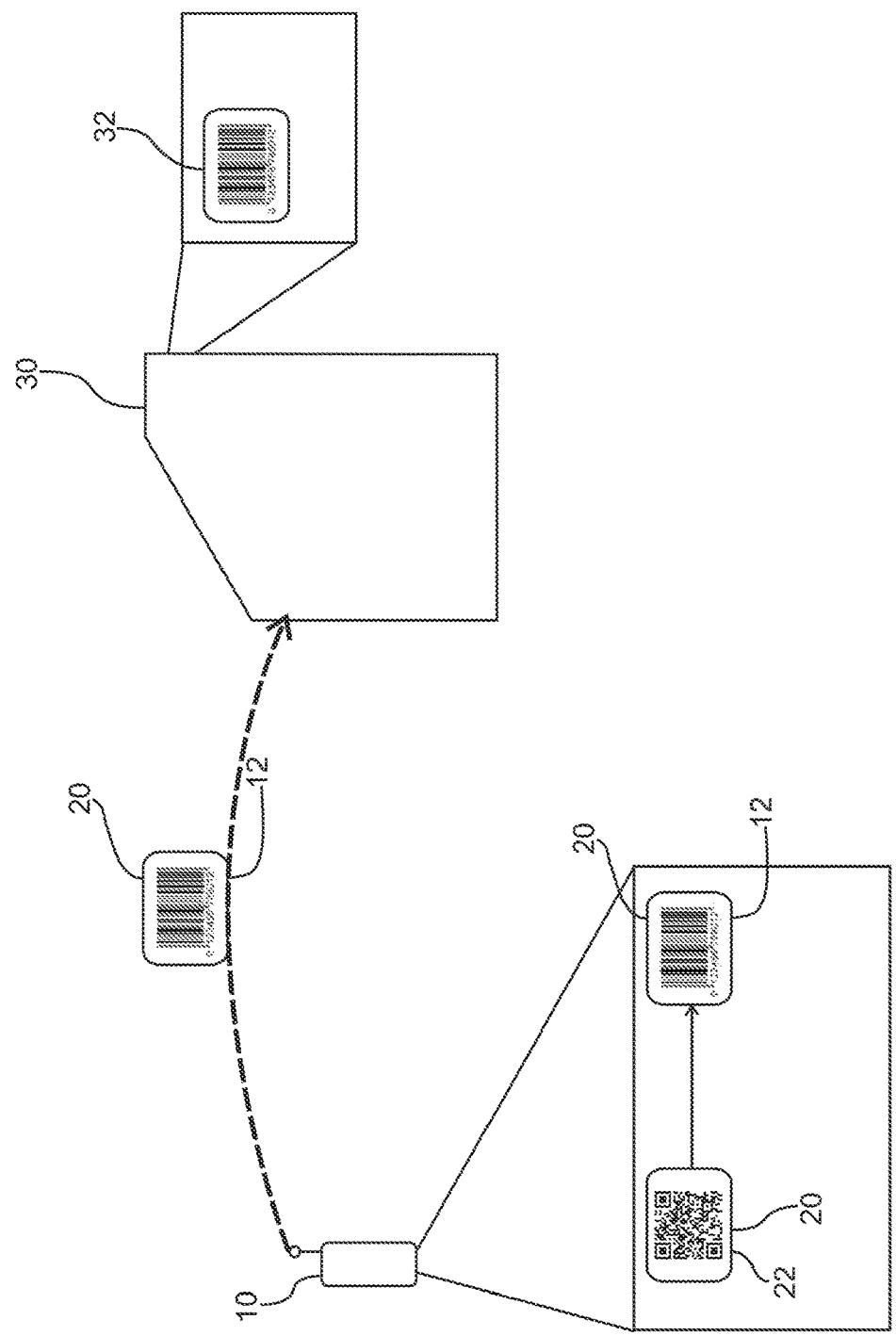
Figure 5:
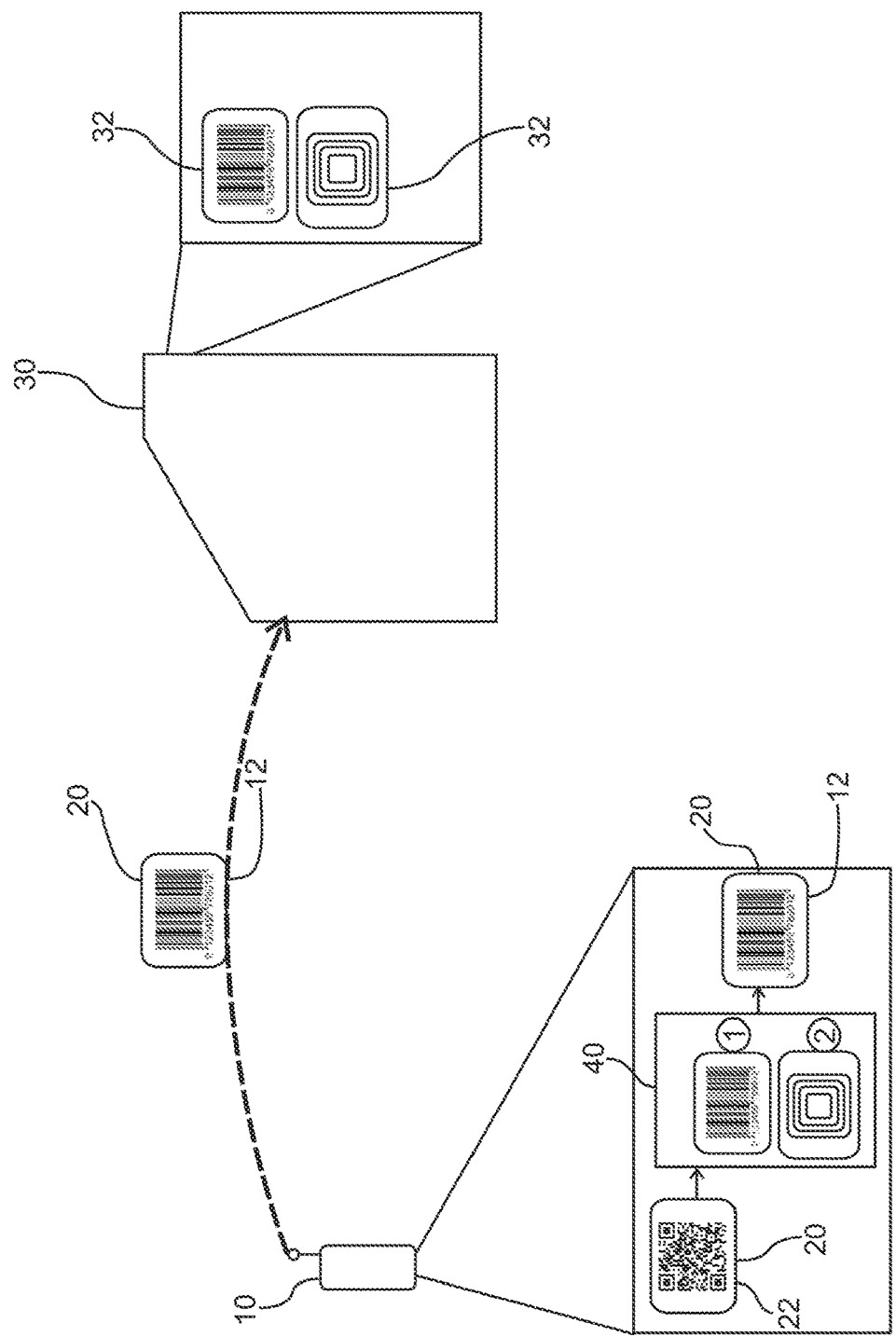

The present invention is disclosed in more detail with respect to the accompanying drawings. The drawings show in a schematic way:

FIG. 1 schematically illustrates the approach of a mobile device to a communication receiver, FIG. 2 schematically illustrates the first step of the situation of an inventive method, FIG. 3 schematically illustrates a possibility of a recognition step, FIG. 4 schematically illustrates a possibility of the transfer of an information element, FIG. 5 schematically illustrates a possibility of a priority list, and FIG. 6 schematically illustrates a possibility of a history list.

DETAILED DESCRIPTION OF THE INVENTION

According to the FIGS. 1, 2, 4 an inventive method is described. In FIG. 1 it can be seen that a mobile device 10 approaches into a proximity area around the communication receiver 30. After the mobile device 10 has entered into the proximity area, which is shown by dotted lines, the inventive method is started by the recognition step.

FIG. 2 shows the specific situation as to possible communication. The communication receiver 30 has only one receiving information type 32 in form of a barcode. The mobile device 10 comprises the information element 20 in form of a storing information type 22 of a QR code. Therefore, a communication is not possible in a direct way and would have been denied according to state of the art methods.

According to the present invention, now a recognition step is carried out starting from the mobile device 10. A recognition request RR is sent to the communication receiver 30 and the communication receiver 30 is triggered to answer with a recognition answer RA to the mobile device 10. Now, the mobile device 10 and in particular a respective computer program product in form of an application on the mobile device 10 knows about possible compatibilities. Due to the fact that in this case the mobile device 10 is not only able for sending information type of a QR code but also in form of a barcode a transformation step can take place, which is disclosed in FIG. 4. The information element 20 with the stored information type 22 in form of a QR code is transformed into an information element 20 with a sending information type 12 of a barcode. That transformed information element 20 is sent to the communication receiver 30 with the sending information type 12, which is compatible to the barcode of the receiving information type 32 of the communication receiver 30. Therefore, the communication channel is enabled in this situation by the inventive method.

FIG. 5 shows a special situation. In this case, the communication receiver is able to receive two different receiving information types 32, namely a barcode and a RFID code. In the mobile device 10 now a priority list 40 provides a specific order that in the case of these two possible receiving information types 32 a transformation has to take in the top priority sending information 12, namely the barcode in this situation. Therefore, the transformation step is based on that priority list 40.

FIG. 6 shows the possibility of storing already finished communications between the mobile device 10 and the communication receiver 30. In particular, the sending information type 12 is stored specifically for each communicated communication receiver 30. For the second, third and further communication with the same communication receiver 30 or the same type of a communication receiver 30, the recognition step can be now carried out within the mobile device 10. Therefore, the stored sending information type 12 can be used for the further communications with the same communication receiver 30 and thereby speeding up the whole method.

Aforesaid description of the accompanying drawings is only by the way of detail. Specific features of each aspect of the present invention and of the figures can be combined with each other if of technical sense.

REFERENCE SIGNS 10 mobile device
12 sending information type
20 information element
22 storing information type
30 communication receiver
32 receiving information type
40 priority list
50 history list
100 mobile network
RR recognition request
RA recognition answer

What is claimed is:

1. A method for enabling a communication between a mobile device (10) and a communication receiver (30), comprising the following steps:
   recognizing at least one receiving information type (32) of the communication receiver (30),
   transforming a storing information type (22) of an information element (20) into a sending information type (12) of the mobile device (10) which is compatible with the recognized receiving information type (32) of the communication receiver (30),
   wherein the recognizing step is carried out automatically in response to approximation of the mobile device (10) to the communication receiver (30).

2. The method according to claim 1, wherein the recognizing step includes sending a recognition request (RR) to the communication receiver (30), thereby triggering the communication receiver (30) to send a recognition answer (RA) to the mobile device (10).

3. The method according to claim 2, wherein the recognition request (RR) is sent from the mobile device (10).

4. The method according to claim 1, further comprising the step of comparing the recognized receiving information types (32) with sending information types (12) of the mobile device (10).

5. The method according to claim 1, wherein, when two or more sending information types (12) are compatible with the recognized receiving information types (32), the storing information type (22) of the information element (20) is transformed into one specific compatible sending information type (12) according to a priority list (40).

6. The method according to claim 1, further comprising the step of sending the information element (20) in the sending information type (22) to the communication receiver (30).

7. The method according to claim 6, wherein the information element (20) is sent via at least one of the following communication channels: Bluetooth, WLAN, NFC, SMS, and Infrared transmission.

8. The method according to claim 1, wherein the transforming step is carried out based on an activation or a selection of a user of the mobile device (10).

9. The method according to claim 1, wherein the recognizing step is carried out based on an activation or a selection of a user of the mobile device (10).

10. The method according to claim 1, wherein the recognized at least one receiving information type (32) and/or the sending information type (12) of the transforming step is stored for subsequent communications with the same communication receiver (30) or other communication receivers (30) of the same type.

11. The method according to claim 10, wherein the recognized at least one receiving information type (32) and/or the sending information type (12) of the transforming step is stored at the mobile device (10).

12. The method according to claim 10, wherein the stored at least one receiving information type (32) and/or the stored sending information type (12) of the transforming step is sent to other mobile devices (10).

13. The method according to claim 12, wherein the stored sending information type (12) of the transforming step is sent to other mobile devices (10) via a mobile network (100).

14. A computer program product stored on a computer readable medium enabling a communication between a mobile device (10) and a communication receiver (30), comprising:
   computer readable program means initiating a computer to recognize at least one receiving information type (32) of the communication receiver (30), and
   computer readable program means initiating the computer to transform a storing information type (22) of an information element (20) into a sending information type (12) of the mobile device (10) which is compatible with the recognized receiving information type (32) of the communication receiver (30),
   wherein the computer program product comprises computer readable program means initiating the computer to carry out the method of claim 1.

* * * * *